United States Patent [19]

Boutaghou

[11] Patent Number: 5,585,980
[45] Date of Patent: Dec. 17, 1996

[54] LOW FRICTION DEVICE FOR AN ACTUATOR ARM OF A DISK DRIVE

[75] Inventor: Zine-Eddine Boutaghou, Rochester, Minn.

[73] Assignee: International Business Machines Corporation, Armonk, N.Y.

[21] Appl. No.: 257,753

[22] Filed: Jun. 9, 1994

[51] Int. Cl.$^6$ .............................. G11B 5/54; G11B 21/22
[52] U.S. Cl. .................................... 360/105; 360/104
[58] Field of Search ..................... 360/104–106

[56] References Cited

U.S. PATENT DOCUMENTS

| | | | |
|---|---|---|---|
| 4,253,125 | 2/1981 | Kanamuller | 360/99 |
| 4,571,648 | 2/1986 | Barski | 360/105 |
| 4,752,848 | 6/1988 | Garcia et al. | 360/105 |
| 4,870,703 | 9/1989 | Augeri et al. | 360/98.07 |
| 4,933,785 | 6/1990 | Morehouse et al. | 360/78.04 |
| 4,991,045 | 2/1991 | Oberg | 360/104 |
| 5,068,841 | 11/1991 | Nakayama et al. | 369/13 |
| 5,189,575 | 2/1993 | Onooka et al. | 360/105 |
| 5,237,472 | 8/1993 | Morehouse et al. | 360/105 |
| 5,341,260 | 8/1994 | Jabbari | 360/105 |
| 5,371,939 | 12/1994 | Ressmeyer et al. | 29/603 |

FOREIGN PATENT DOCUMENTS

| | | | |
|---|---|---|---|
| 627508 | 5/1963 | Belgium | 360/105 |
| 0108500 | 5/1984 | European Pat. Off. | |
| 60-258778 | 12/1985 | Japan | |
| 60-247870 | 12/1985 | Japan | |
| 1-294283 | 11/1989 | Japan | 360/103 |
| 3237688 | 10/1991 | Japan | |
| 4258858 | 9/1992 | Japan | |
| 6-76509 | 3/1994 | Japan | 360/105 |

*Primary Examiner*—Jefferson Evans
*Attorney, Agent, or Firm*—Lawrence R. Letson

[57] ABSTRACT

A low friction load/unload device for retracting a slider from or restoring a slider to the disk of a DASD (Disk Access Storage Device), having a ball bearing mounted on the load beam to engage an inclined surface with minimum frictional forces is disclosed. Whenever the inclined surface is part of a ring which rotates with the disk, the use of the ball bearing contact is highly advantageous since it substantially reduces and may eliminate those friction or stiction forces between the load/unload device and the ring member which would inhibit disk start up and disk rotation. The incorporation of the ball bearing into a tang for engagement with the inclined surface of the ring or ramp substantially reduces forces resisting operational forces generated both by the actuator motor and disk drive motor, thereby allowing smaller motor structures to be incorporated into reduced-size DASD units.

11 Claims, 3 Drawing Sheets

LOW FRICTION DEVICE FOR AN ACTUATOR ARM OF A DISK DRIVE

FIELD OF THE INVENTION

This invention relates to a Disk Access Storage Device (DASD) and specifically to the loading and unloading device which allows the slider of the DASD to be placed into or removed from close proximity to the magnetic disk.

BACKGROUND OF THE INVENTION

In some Disk Access Storage Device (DASD) designs particularly at start up, friction and stiction forces significantly resist the rotation of the disk and spindle requiring a more powerful drive motor and, in turn, also requiring larger spaces. In small DASD units, the disk drive motors and actuator motors are sized generally to produce just enough torque to operate the DASD in its worst case or most demanding condition, typically the start up. At start up, the disks must be accelerated and the friction/stiction forces overcome; because the stiction/friction forces may be additive, the drive motor may not be sufficient to overcome these forces to accelerate the disks.

The advantages of unloading the head from the disk surface to prevent stiction and further to prevent damage to the magnetic disk surface are well known. DASD designs commonly include a ramp or inclined surface located generally adjacent the edge of the magnetic disk. An example of such an outer diameter unload/load ramp is illustrated in U.S. Pat. 5,189,575, issued to Onooka, et al. An inside diameter load/unload ramp is disclosed in co-pending application, Ser. No. 08/172,366 filed Dec. 21, 1993, abandoned, by Lowell J. Berg, et al., and commonly assigned herewith. A rotating frustum of a cone load/unload surface is illustrated in U.S. Pat. No. 4,752,848, issued to Garcia, et al.

While the effect of friction or stiction forces between the slider and the magnetic recording disk may be eliminated whenever the slider is unloaded and the disk stopped, relatively significant stiction and friction forces remain, although smaller, between the portions of the load beam and the ramp. In order to reload the slider onto the surface of the magnetic recording disk, the actuator arm must be moved to displace the distal end of the actuator arm away from the unload or parking area. The initial impulse necessary to move the actuator arm to reload the slider onto the disk is large enough that velocity controls must be implemented to reduce both the horizontal and vertical velocity of the slider to prevent disk damage. These velocity controls are expensive to implement.

While the absolute magnitude of forces required to move the load beam relative to the inclined ramp may be quite small, such as illustrated in co-pending application Ser. No. 08/172,366 referenced above, such forces contribute in a very significant way to the load on the actuator motor. As the load beam of the actuator is static in its unloaded position, inertia and friction/stiction forces between the unload tang and the unload ramp combine to resist movement of the load beam and slider towards a region over the surface of the magnetic disk. These same forces also resist start up of the disks whenever the unload tang rests on a surface that rotates with the disk and spindle. Similarly, friction between the surface of the tang and the load/unload ramp tends to resist the unloading of the slider from the surface of the disk and must be accommodated in the sizing of the actuator motor.

In as much as the inclined surface of the load/unload ramp may be a part of spacer rings between adjacent disks in a multi-disk DASD, the tang of the unload device may engage the ramp which is continuously rotating about the axis of rotation with the disks. In a stopped or static condition, the inclined surface and the load beam do not move relative to each other; the stiction forces between the load/unload device on the actuator arm and the surface of the inclined load/unload ramp are significant in the overall force loading of the drive motor. Accordingly, the disk drive motor must be sized with sufficient torque capacity to overcome the stiction forces to restart the disk. An example of such a rotating inclined surface acting as an unload/load ramp is U.S. Pat. No. 4,752,848, issued to Garcia, et al., on Jun. 21, 1988.

An example of a disk drive with the load/unload ramp disposed outside the periphery of the disk surface is described in U.S. Pat. No. 4,933,785, issued to James H. Morehouse, et al., which engages a ramp with a point engagement using a conical member which will increase the forces necessary to move the cam follower relative to the cam due to the potential deformation of the conical member or the ramp at the point of engagement.

SUMMARY OF THE INVENTION

It is an object of the invention to reduce friction/stiction forces between the load beam tang of the load/unload device and the load/unload ramp of a DISK Access Storage Device (DASD).

It is a further object of the invention to reduce the height required to accommodate the drive motor and actuator motor within a DASD by reducing the motor torque requirements and motor sizes.

It is another object of the invention to reduce the power requirements of the drive motor and actuator motor of a DASD, necessary to start the disk pack and to load and/or unload the slider from the disk surfaces.

A DASD actuator has a load beam which is provided with a load/unload tang. The load/unload tang extends generally from the distal end of the load beam near where the slider is attached to the load beam. The low friction aspect of the instant invention is provided by a spherical ball trapped in a self-lubricating ball guide. In turn, the ball guide is attached to the load beam tang in such a way as to expose at least part of the surface of the ball bearing to the inclined surfaces of the load/unload ramp.

Due to the nature of the material, a lubricated polyamide forming the ball guide, the ball bearing rotates within the ball guide and is lubricated by the ball guide. The ramp also may be fabricated from a lubricated polyamide material. The ball bearing provides point contact or a very small area contact between the load/unload device and the ramp and due to rolling contact therebetween reduces, if not essentially eliminates, stiction and friction forces between the load/unload device and the load/unload ramp.

Rolling friction rather than sliding friction is encountered as the tang is moved over the ramp surfaces. Typically, rolling friction is significantly less than sliding friction by at least an order of magnitude. The rolling friction and self-lubrication of the ball bearing reduce the forces required for disk start up and/or removal of the slider from the parking area but also reduce the power requirements for the respective motor driving components of the DASD.

Wherever the load/unload ramp is incorporated into the region surrounding the hub of the DASD between any adjacent disks of the DASD, the load/unload ramp forms a frustum of a cone and the inclined surface of the load ramp rotates with the hub and disks. By engaging the surface of the load/unload ramp with a rolling contact member, the forces exerted onto the load/unload ramp which would otherwise tend to restrict or impede the rotation of the disks, as especially found at disk start up, are significantly reduced from those associated with sliding engagement. This reduction of friction and stiction diminishes the need to oversize the disk drive motor and the actuator motor.

A more detailed understanding of the invention may be had by referring to the drawings which are described below together with the detailed description of the preferred embodiment.

DRAWINGS

A DETAILED DESCRIPTION OF THE BEST MODE OF THE PREFERRED EMBODIMENT AS CONTEMPLATED BY THE INVENTOR FOR CARRYING OUT THE INVENTION

Figure 1:
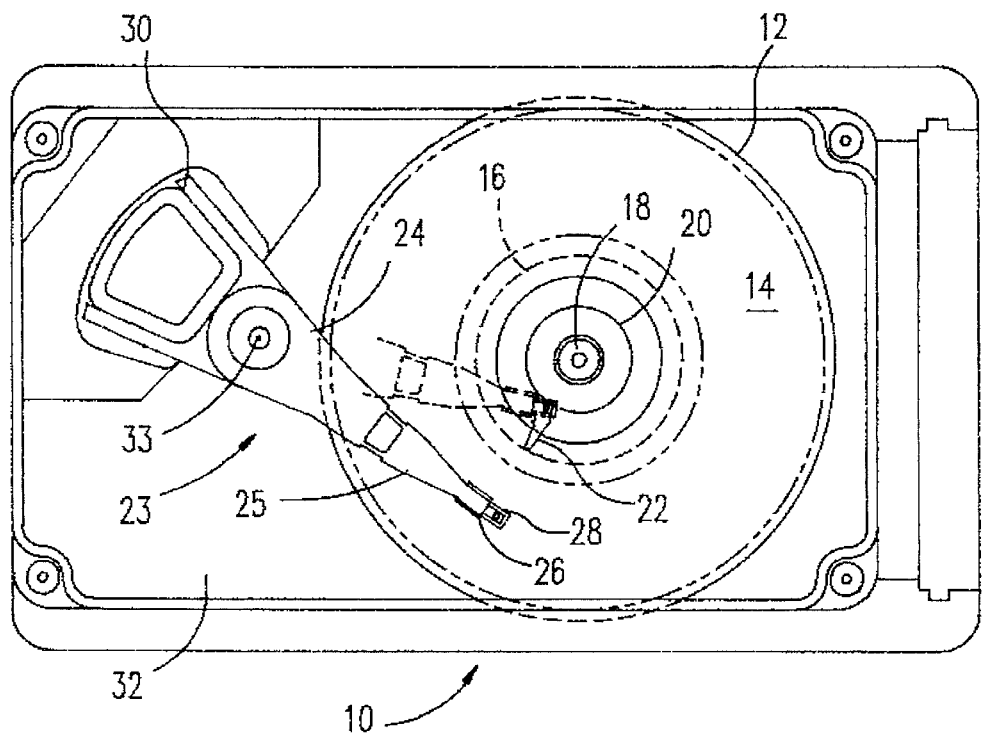
FIG. 1 is an illustration of a Disk Access Storage Device (DASD) incorporating the low friction load/unload device of the present invention.

Referring initially to FIG. 1, a DASD is illustrated at 10, and has a rotatable, magnetically recordable disk 12 with a recording surface 14. Disk 12 is rotated by drive motor 16 and about shaft 18. The DASD 10 is provided with a ramp mount 20 which positions and supports load/unload ramp 22.

In order to record or retrieve data that has been previously recorded on a disk 12, an actuator 23 is provided. Actuator 23 is comprised of a load beam 25, actuator arm 24, and an actuator drive motor 30. Actuator drive motor 30 drives actuator arm 24 about pivot shaft 33 which in turn is mounted on or supported by frame 32 of DASD 10 so that arm 24 moves load beam 25 over surface 14 of disk 12.

Similarly, drive motor 16 is mounted on frame 32 in order to maintain a well defined spatial relationship between the shaft 18 and the pivot shaft 33.

Load beam 25 in turn supports slider 26. Formed as an extension of load beam 25 is a load/unload tang 28 extending beyond slider 26 and disposed for engagement with ramp 22 when oscillated inward toward shaft 18 by actuator motor 30.

Figure 2:
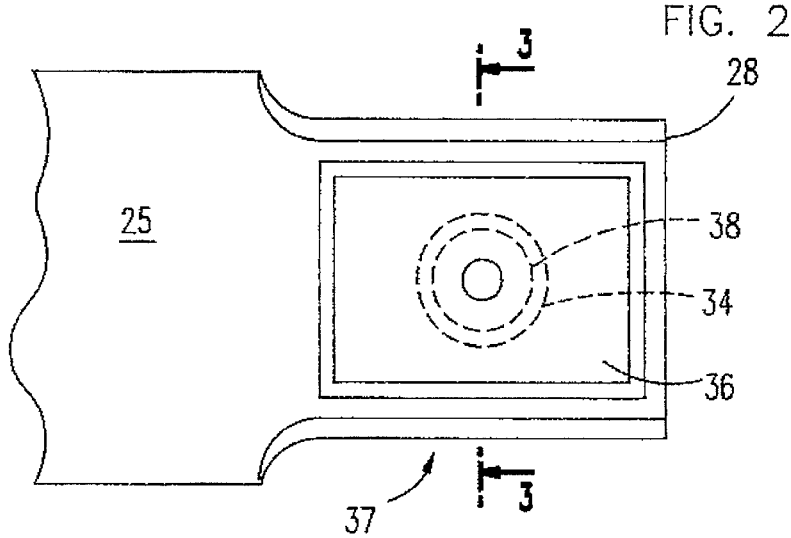
FIG. 2 is a top enlarged view of the low friction load/unload device of the present invention.

Referring now to FIG. 2, the load/unload tang 28 extending from load beam 25 is illustrated. A tang 28 is provided with a hole 34, typically by punching, through the material of the tang 28. Disposed over the hole 34 and load/unload tang 28 is a ball guide 36. The ball guide 36 acts to retain a ball bearing 38 with a portion of the ball bearing 38 protruding through the hole 34 for exposure to the load/unload ramp, to be described later.

Figure 3:
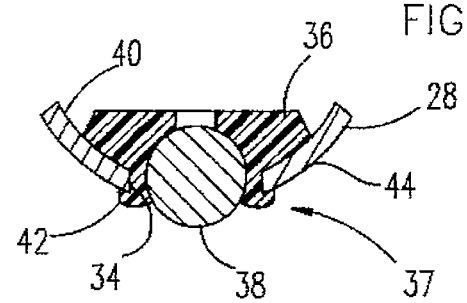
FIG. 3 is a sectional view of the low friction load/unload device of the present invention along line 33 in FIG. 2.

FIG. 3, a section end view, illustrates tang 28 with the ball guide 36 and ball bearing 38 disposed on the tang 28 and with the ball bearing 38 protruded through hole 34.

Ball guide 36 may be advantageously made of a lubricated polyamide material in order to provide self-lubrication characteristics and thus relatively easy frictionless rotation of the ball bearing 38. Polyamides typically form a matrix which may be loaded with a lubricating oil, forming a lubricated polyamide. The ball guide 36 may be adhesively attached to the upper surface 40 of the load/unload tang 28 using conventional adhesives or bonding materials or it may be easily snap assembled if the ball guide 36 is provided with protruding tabs 42 which will snap over tang 28 and engage the lower surface 44 of tang 28. Other attachment techniques may be implemented, bearing in mind the important aspect is that the ball bearing 38 must be exposed for engagement with the load/unload ramp 22 and must be spatially fixed relative to the tang 28.

Figure 4:
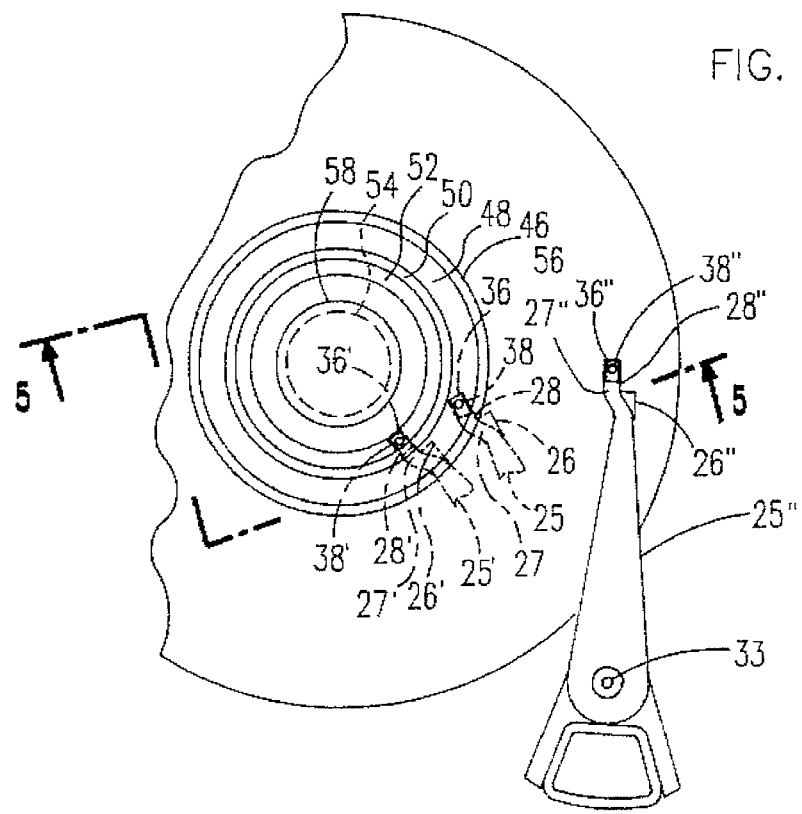
FIG. 4 is a partial top view of a disk of a DASD where the load/unload ramp is illustrated as a ring surrounding the DASD spindle, engageable by the low friction load/unload device of the present invention.
Figure 5:
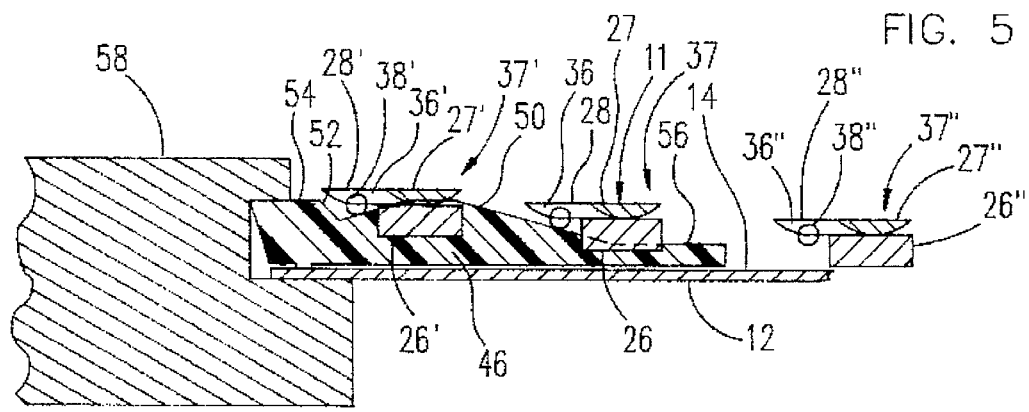
FIG. 5 is a section view along section line 5—5, of the ring in FIG. 4, with the low friction load/unload device illustrated in various positions.

Whenever an inclined surface engageable by the ball bearing 38 is formed into a load/unload ramp ring 46 to rotate with the disk 12, as illustrated in FIGS. 4 and 5, it may be necessary or desirable to offset tang 28 so that the ball bearing 38 protruding from ball guide 36 may engage the rotating load/unload inclined surface 48 formed in a ring 46 while limiting the length of tang 28.

Load/unload ramp ring 46 preferably is provided with several surfaces for controlling tang 28 and slider 26. With reference to both FIGS. 4 and 5, surface 48 is the inclined load/unload surface of ramp ring 46. Surface 50 is a dwell surface which provides a smooth transition between inclined surface 48 from the rest surface 52. Surface 54 is a clamping surface whereby the hub 58 may be forcibly clamped with ring 46 to retain ring 46 in position relative to both hub 58 and recording disk 12. Extending generally radially and outwardly from the lower elevations of the inclined surface 48 of ramp ring 46 is a delimiter surface 56 which acts as a restraining surface over which at least a portion of slider 26 is suspended whenever the slider 26 occupies position 26', as illustrated in FIG. 4. The delimiter surface 56 prevents the slider 26 from impacting surface 14 of disk 12 in the event of shocks or bumps to the DASD 10. The prevention of such impacts prevents slider 26 and disk surface 14 from being damaged whenever the DASD 10 is bumped or dropped. The ramp ring 46 may also be fabricated of the lubricated polyamide to further reduce friction/stiction forces.

Slider 26 is illustrated at positions 26, 26', and 26" in both FIG. 4 and 5, showing a variety of different locations that the slider 26 may occupy depending upon the orientation of load beam 25, as illustrated in positions 25, 25', and 25". As one may observe most clearly in FIG. 5, tang 28 supports ball guide 36, 36', and 36" in the various positions of load beam 25. Similarly ball guide 36, 36', and 36" respectively locate ball bearing 38 at positions 38, 38', and 38". As easily observed in FIG. 5, the ball bearing 38" is not engaged with load/unload inclined surface 48, and the slider 26" is flying or floating above recording surface 14 of disk 12.

As the actuator arm 24 and load beam 25 in FIG. 4 are rotated counter clockwise, ball bearing 38 engages inclined surface 48 and will cause the lifting of tang 28 and slider 26 as the ball bearing 38 is translated relative to inclined surface 48. Ball bearing 38 then will ride over dwell surface 50 and lower onto the rest surface 52 to occupy the position of ball bearing 38'. The engagement of ball bearing 38' with the rest surface 52 and the spring force exerted on ball bearing 38' by load beam 25 will act as a detent to retain tang 28' and slider 26' in the unloaded position.

The tang 28 may be offset to one side of the slider 26 as best seen in FIG. 4. This offset permits a shorter tang 28 and more compact design for the DASD 10.

Surface 54 may be engaged by hub 58 to clamp the ring 46 and disk 12 to the hub 58.

Figure 6:
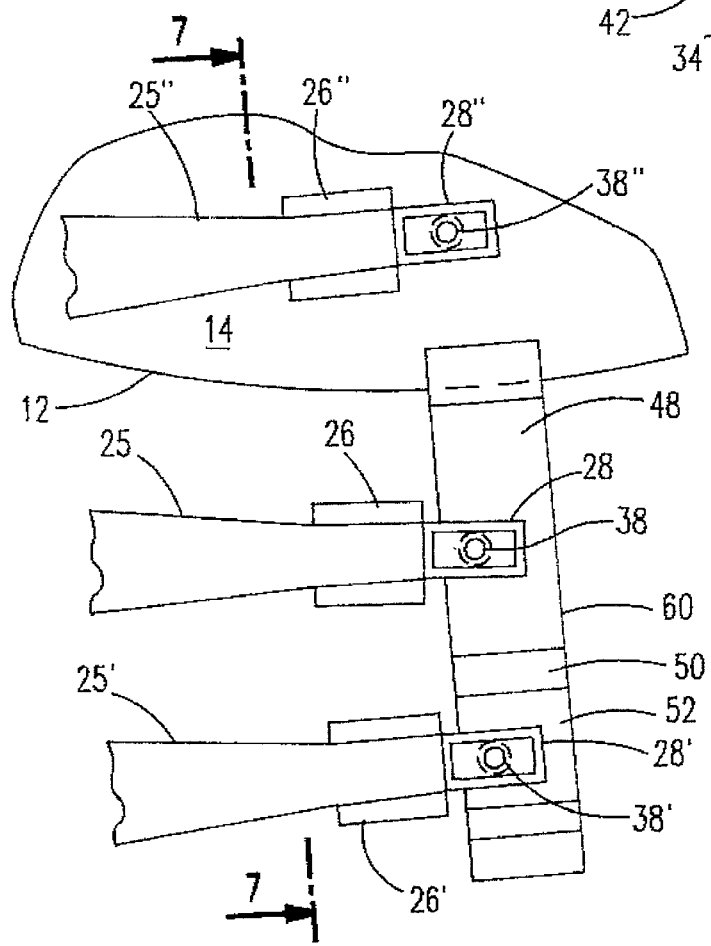
FIG. 6 illustrates an outer diameter ramp positioned for cooperative engagement with the low friction load/unload device of the present invention.
Figure 7:
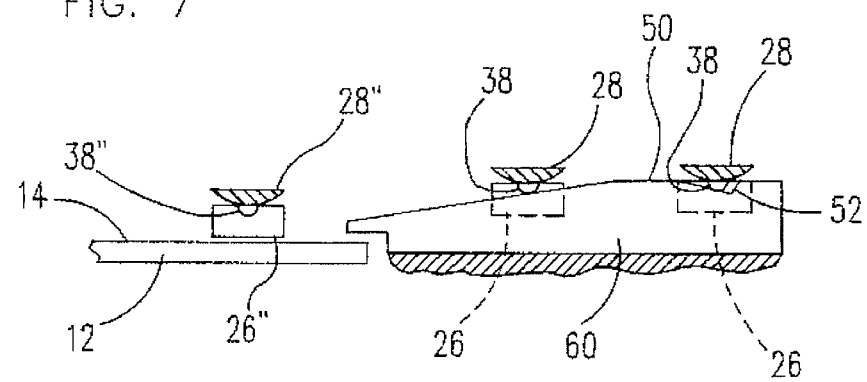
FIG. 7 is a sectional view taken along section line 7—7 of FIG. 6.

Load/unload ramp 60, similar to ramp 22 of FIG. 1, may be disposed adjacent to the external edge of disk 12 as illustrated in FIGS. 6 and 7. The slider 26" floats or flies over the recordable surface 14 of disk 12.

While the inclined surface 48 as illustrated in FIGS. 4 and 5 is part of a spacer/ramp ring 46, the same inclined surface 48 may exist as a segment of a ring forming the load/unload ramp in FIGS. 6 and 7. Inclined surface 48 in FIGS. 6 and 7 acts to raise the ball bearing 38 and tang 28 from the disk surface 14, as the tang 28 is translated in a rightward direction from the position 28" toward the position 28'. As the ball bearing 38 progresses from the position 38" rightward, it will increasingly rise along surface 48 and pass over dwell surface 50 to engage with the rest surface 52. Inasmuch as the components of the load/unload device 37, tang 28, slider 26, as well as ball bearing 38 are illustrated in various positions, reference numerals 28", 38", and 26" are used to denote those respective elements in a flying position over disk 12. The load/unload device 37 also is illustrated in a location where the ball bearing 38' is engaged with the rest area surface 52 and designated correspondingly with reference numerals 28' and 26'.

Figure 8:
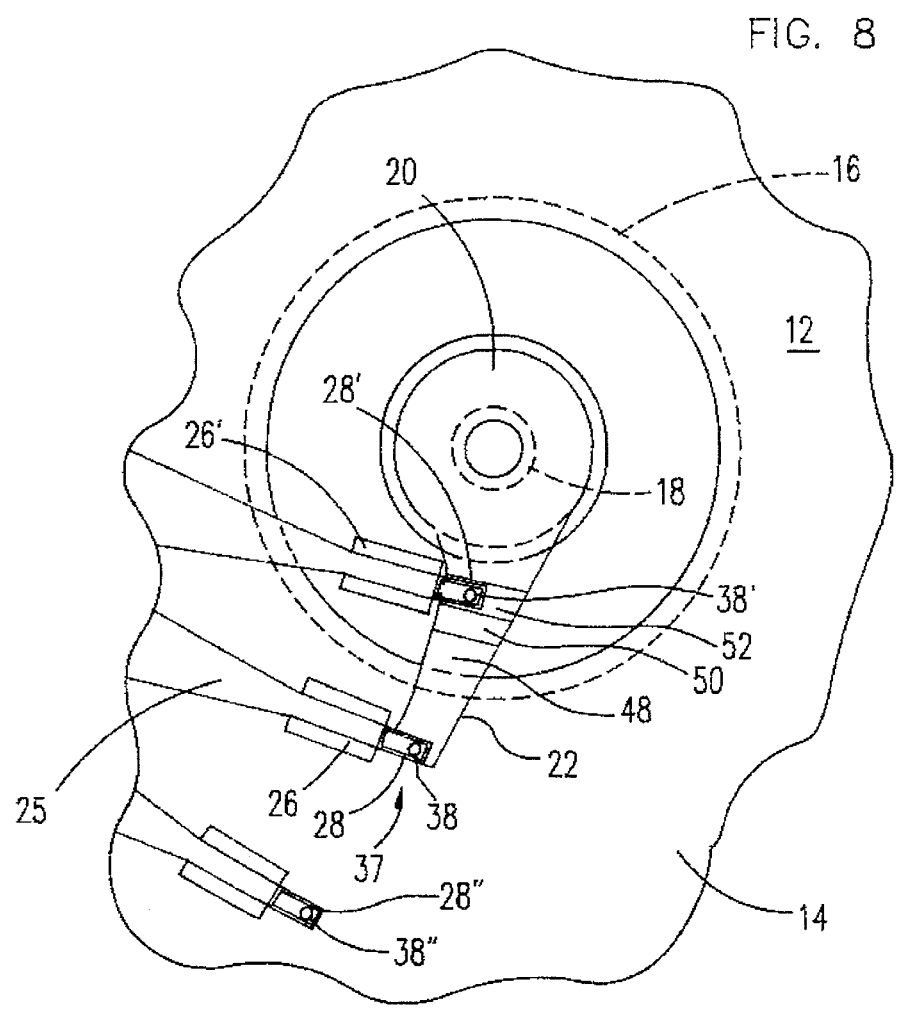
FIG. 8 is a partial view of a DASD disk and a fixed inner diameter load/unload ramp engaged by the low friction load/unload device of the present invention, with the load beam and slider illustrated in various positions.

Due to the advantageous design and construction of the low friction load/unload device 37, the present invention may also be utilized with a single, finger type ramp attachment 22, such as illustrated in FIG. 1 and illustrated in more detail in FIG. 8. Ball bearing 38 attached to tang 28 will engage load/unload ramp 22. The ball bearing 38 will significantly reduce friction with the load/unload ramp 22 due to the rolling friction of ball bearing 38 as it moves along ramp 22.

The ball bearing 38 and tang 28 are illustrated in the unloaded position in contact with ramp 22 at 38' and 28', respectively. Similarly, the location of the low friction load/unload device 37 of the present invention is illustrated over the recording surface 14 of disk 12 where tang 28" and ball bearing 38" are illustrated.

Without regard to the location of the inclined surface 48 with respect to the interior or the exterior of the disk 12, as the ball bearing 38 traverses the inclined surface 48 of ramp 22, 60 or ring 46 progressing toward dwell surface 50, both the tang 28 and slider 26 will be deflected away from the recording surface 14 of disk 12. Tang 28 is displaced for the protection of both the slider 26' and the recording surface 14 of disk 12 to position 28' wherein the ball bearing 38' engages rest area or parking surface 52 in order to park the slider 26' in a position removed from and not engageable with the recording surface 14 of disk 12.

While DASD 10 disk start-up forces are not a factor in the implementation illustrated in FIGS. 1, 6, 7 and 8, the ball bearing 38 engagement with the load/unload ramp 22, 60 in these figures reduces the forces necessary to load and unload the slider 26 from the load/unload ramp 22, 60, and thereby reduces the maximum torque design requirements for the actuator motor 30 at start up when there may be otherwise stiction/friction forces between the ramp 22, 60 and tang 28/ball bearing 38. Start up forces necessary to overcome both friction and stiction and to restore DASD 10 disk 12 to normal operation and speed would be reduced by the engagement of tang 28 and ball bearing 38 with the load/unload ramp ring 46 as found in FIGS. 4 and 5. In either case, the incorporation of the ball bearing 38 into the load/unload tang 28 extending from the distal end 27 of load beam 25 significantly reduces the forces required to operate the DASD 10, both from the standpoint of the forces required of disk drive motor 16 but as well as the forces generated by actuator motor 30. The reduction of the necessary reloading forces eliminates the need for velocity control schemes to reduce the vertical velocity of the slider 26. The chances of damaging the disk 12 by impacting the slider 26 into the disk surface 14 due to high vertical velocity is thus greatly reduced.

The ball bearing 38 may be disposed between the actuator pivot shaft 33 and the slider 26 if the outer diameter ramp 60 of FIG. 6 is positioned appropriately, and the loading and unloading may be as successfully accomplished.

The precise arrangement of the components relative to each other and to the components of the DASD 10 may be varied according to the design constraints of the DASD 10 without departing from the scope of the invention defined by the appended claims as long as the load/unload device 37 incorporates a rolling member, preferably a ball bearing member 38, which then would engage the load/unload inclined surface 48 incorporated into the DASD 10.

Other minor modifications and variations may be incorporated by one of skill in the art without departing from the scope of the invention as defined by the appended claims.

I claim:

1. An actuator for a disk access storage device comprising:

an actuator motor for driving said actuator to any of a plurality of positions:

at least one actuator arm drivable by said motor about an axis, said actuator arm extending from said axis;

said actuator arm comprising a load arm, a load beam and a slider;

said load arm supporting said load beam with said load beam having a distal end, said distal end formed into a load/unload tang;

said slider attached to said load beam proximate said distal end to fly above a recording surface of a disk of said disk access storage device;

said load beam load/unload tang further comprising a ball bearing and a ball guide disposed proximate said distal end for disposing said ball bearing therein for rolling engagement with a surface inclined relative to said disk of said disk access storage device;

said ball bearing and said ball guide disposed on said load/unload tang such that said ball bearing may contact said inclined surface and said slider remains disengaged from said disk at all times;

whereby said distal end and said load unload tang of said load beam may be deflected by said ball bearing engaging said inclined surface and traversing said inclined surface, thereby preventing contact between said disk and any portion of said actuator.

2. The actuator of claim 1 wherein said ball guide is attached to said load beam and said ball bearing is retained by said ball guide.

3. The actuator of claim 2 wherein said ball guide is comprised of a self-lubricating material.

4. The actuator of claim 3 wherein said material is a lubricated polyamide.

5. A disk Access Storage Device for storing data comprising:

a frame;

an actuator having a motor and a t least one actuator arm driven by said motor;

at least one rotatable recording disk; an inclined surface, relative to said disk, disposed adjacent said disk;

said actuator arm comprising a slider for flying over said disk and a load/unload extension comprising a ball guide and a ball bearing guided thereby rotatably disposed to engage said inclined surface and prevent engagement of said slider and said disk, whereby said slider may be lifted from or lowered into proximity of said disk without contacting said disk by relative movement between said actuator arm and said inclined surface.

6. The Disk Access Storage Device of claim 5 wherein said arm further comprises said ball guide disposed on said extension, said ball guide retaining said ball bearing for rotation, said ball bearing location remaining spatially fixed relative to said extension.

7. The Disk Access Storage Device of claim 6 wherein said disk further comprises a recordable surface having an inner and outer limit and wherein said inclined surface is further disposed proximate said inner limit of said recordable surface, whereby movement of said actuator arm beyond said inner limit lifts said slider from proximity of said recordable surface.

8. The Disk Access Storage Device of claim 6 wherein said disk further comprises a recordable surface having an inner and outer limit and wherein said inclined surface is further disposed proximate said outer limit of said recordable surface, whereby movement of said actuator arm beyond said outer limit lifts said slider from proximity of said recordable surface.

9. The Disk Access storage Device of claim 6 wherein said inclined surface forms a frustum of a cone.

10. The Disk Access Storage Device of claim 9 wherein said frustum of a cone is disposed for rotation with said disk.

11. The Disk Access Storage device of claim 10 wherein said inclined surface is a surface on a ring disposed to engage said disk and retain said disk relative to at least a part of said motor.

* * * * *